Patented June 9, 1953

2,641,598

UNITED STATES PATENT OFFICE 2,641,598

IODOMETHYLATE COMPOUNDS OF THE DIMETHYL XANTHINE SERIES

Alexis J. M. Moussalli, André Soubiran, and Pierre Chabrier, Paris, France

No Drawing. Application June 13, 1949, Serial No. 98,872. In France June 28, 1948

2 Claims. (Cl. 260—253)

Theophylline or 1:3-dimethyl xanthine

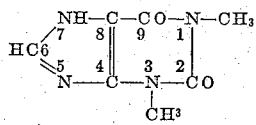

as employed for therapeutic purposes is sparingly soluble in water, and it has been endeavoured to convert it into more readily soluble derivatives, particularly by substituting suitable radicles for the hydrogen atom bound to the nitrogen atom in 7-position. Thus it has been proposed to substitute a glyceryl radicle. However the compounds or molecule associations heretofore proposed to allow of a more practically administration of theophylline show the inconveniency of exhibiting an alkalinity which always renders such an administration painful. A compound closely related with theophylline from the standpoint of molecular structure is theobromine or 3:7-dimethyl-xanthine and similar difficulties are experienced in the practical employment thereof.

It is an object of our invention to provide a new class of dimethyl xanthine derivatives which are free from the above drawback and allow of effecting a substantially painless administration of theophylline or theobromine through parenteral way, particularly as aqueous solutions thereof by reason of the great solubility of said derivatives in water.

A further object is to provide dimethyl xanthine derivatives which are capable of associating the action of either theophylline or theobromine with that of other medicines under desirable conditions of synergy.

According to this invention we provide new derivatives of theophylline and theobromine wherein an organic radical having a primary, secondary or tertiary (possibly salified) amino group or a quaternary group is substituted for the hydrogen atom connected to the nitrogen atom in position 7 or 1.

Although any organic radical may be present, we prefer for obvious economical reasons, simple radicals derived from compounds which are readily available in industry. Among such radicals aliphatic radicals, more particularly lower aliphatic radicals, are both easier to obtain and to fix, and lead to highly valuable derivatives.

Halides of dialkylamino lower alkanes, particularly diethylamino ethyl and diethylamino methyl chlorides are commonly available in the market, and consequently reference will be made thereto for illustrating our invention, but it should be appreciated that we do not restrict ourselves to fixing amino-alkyl radicals, particularly $\omega$-amino-alkyl radicals, nor to selecting radicals which bear tertiary amino groups.

7-($\beta$-diethylamino-ethyl) theophylline has the advantages of being easily produced by condensing theophylline with $\beta$-diethylamino ethyl chloride in alkaline medium, and of being very soluble in water; furthermore it easily lends itself to the production of mineral and organic acid salts as well as quaternary compounds. Among the products thus obtainable, there is a large number of substances which readily dissolve in water and have a neutral reaction, so that painless administrations thereof through parenteral way are possible. The same is true with $\beta$-dimethylamino ethyl theophylline and corresponding derivatives of theobromine.

Instead of dialkylamino alkane halide, we may also cause dimethyl xanthine to react with the hydro-chloride of said halide; it is only necessary to add the required proportion of alkali for neutralizing all hydrochloric acid produced, to the medium in which the reaction takes place.

Instead of condensing dimethyl xanthine (theophylline or theobromine) directly with a dialkylamino alkyl halide, we may also react an alkanol halide with dimethyl xanthine to produce the 7 or 1 hydroxy-alkyl derivative of dimethyl xanthine, then substitute a halogen atom for the hydroxy group for example by means of thinoyl chloride, and finally react a dialkylamine with said halogeno derivative, eventually to obtain the dialkylamino derivative of dimethyl xanthine. Thus glycol monochlorhydrin and theophylline in substantially equimolar proportions may be reacted in an alkaline medium, then the product may be treated with thionyl chloride in the molar proportion of 1:2 between said product and thionyl chloride, and finally 2 mols of diethylamine may be reacted with 1 mol of the chloro derivative thus formed, to yield diethylamino ethyl theophylline.

Example 1

One mol of theophylline was dissolved in a 1 per cent aqueous solution of one mol of caustic soda. One mol of $\beta$-diethylamino ethyl chloride was added, and the mixture was boiled for 6 hours with reflux, while stirring. The product was evaporated to dryness in a vacuo, and the dry pasty residue was taken up in acetone, to separate the desired compound from sodium chloride associated therewith. The acetone solution was distilled to remove solvent therefrom and 1:3-dimethyl-7-(β-diethylamino)-ethyl xanthine.

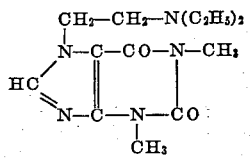

was obtained as a white mass which has a melting point of about 74° C. and is very soluble in water, alcohol and acetone.

By oxidizing the compound in an aqueous solution by means of chlorine water, bromine water or nitric acid, we obtained after evaporating the solution on a water-bath, a yellow residue mainly constituting of amalic acid which is given an orange red colour by ammonia vapours (a reaction which is common to theophylline, theobromine and cafeine).

By operating exactly in the same manner from theobromine instead of theophylline, we obtained 3:7-dimethyl-1-(β-diethylamino)-ethyl-xanthine which has a melting point of 60° C.

*Example 2*

We neutralised 1:3-dimethyl-7-(β-diethylamino)-ethyl xanthine dissolved in a solvent therefor, for example water or alcohol, by means of the calculated amount of a mineral or organic acid, or we effected a double decomposition with a salt of such an acid; we thus obtained a salt of said xanthine compound.

Thus the following compounds were prepared:

| | Melting point, °C. |
|---|---|
| Hyrochloride | 240 |
| Hydroiodide | 198 |
| Camphorsulphonate | 174 |
| Picrate | 210 |
| Dehydrocholate | 225 |
| P-amino-benzoate | 215 |
| Neutral succinate | 197 |

*Example 3*

To an alcohol or acetone solution of 1:3-dimethyl-7-(β-diethylamino)-ethyl xanthine, we added 1 mol of methyl iodide and we allowed to react; the iodo-methylate of said xanthine compound precipitated with a yield above 90 per cent. The iodo-methylate has a melting point of 234° C. and is soluble in water but little soluble in organic solvents.

*Example 4*

We worked in the same conditions as stated in Example 1, but β-dimethylamino-ethyl chloride was substtiuted for β-diethylamino-ethyl chloride; we thus obtained 1:3-dimethyl-7-(β-dimethylamino)-ethyl xanthine

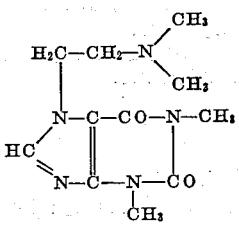

which has a melting point of 95° C.; the hydrochloride thereof has a melting point of 260° C.

In operating as disclosed in Examples 2 and 3, salts and quaternary ammonium derivatives were easily produced from the above dimethylamino ethyl xanthine compound.

*Example 5*

One mol of theophylline was dissolved in one mol of a normal aqueous solution of caustic soda, one mol of bromocholin bromide was added to the solution and direct alkylation was allowed to proceed, then the aqueous solution was distilled.

We thus obtained 1:3-dimethyl-7-(β-dimethylamino)-ethyl xanthine bromométhylate

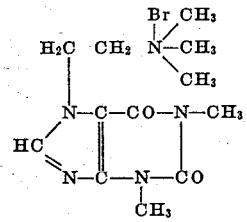

which is soluble in water.

*Example 6*

We dissolved 20 parts by weight of 7-(β-diethylamino)-ethyl theophylline in 60 parts by weight of acetone, and we added 15 parts by weight of methyl camphosulphonate to the acetone solution. After 12 hours of contact, the 7-(β-diethylamino)-ethyl theophylline methocamphosulphonate was filtered off; the compound melts at 193° C. and is very soluble in water: it has the formula:

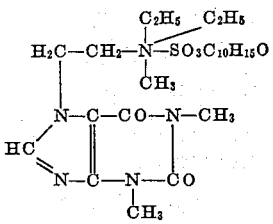

*Example 7*

One mol of theophylline was dissolved in a 2 per cent aqueous solution of two mols of caustic soda, and one mol of hydrochloride of β-morpholyl-ethyl chloride

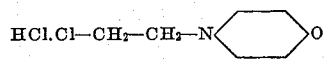

was added to the solution; the whole was boiled with reflux while stirring, for 4 hours. It was then evaporated to dryness, and the dry residue was taken up in acetone for separating the desired compound from accompanying sodium chloride. The acetone solution was distilled to remove solvent, and 7-(β-morpholyl)-ethyl theophylline

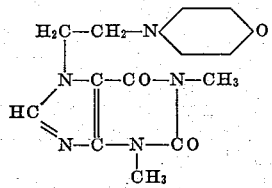

was obtained as a white powder having a melting point of 82° C.

*Example 8*

We worked according to Example 7, substituting hydrochloride of β-piperidyl-ethyl chloride for hydrochloride β-morpholyl-ethyl chloride. We thus obtained 7-(β-piperidyl)-ethyl theophylline having a melting point of 132° C.; it is less soluble in water than the morpholyl-ethyl compound and the diethylamino-ethyl compound, and can be purified by recrystallisation out of boiling water. It has the following formula:

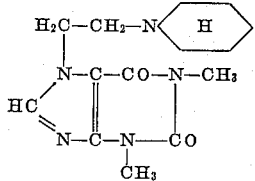

*Example 9*

We worked according to Example 3 with 1-(β-diethylamino)-ethyl theobromine instead of 7-(β-diethylamino)-ethyl theophylline; we thus obtained 1-(β-diethylamino)-ethyl theobromine iodomethylate having a melting point of 192° C.

It should be understood that the foregoing examples are given solely for the purpose of illustrating our invention, and should not be construed as limiting said invention thereto.

We claim:

1. 7-(β-diethylamino-ethyl)-1:3-dimethylxanthine iodo-methylate, a compound which has a melting point of 234° C., is soluble in water but only slightly soluble in organic solvents.

2. An iodomethylate quaternary ammonium compound of a tertiary-amino-alkyl-dimethylxanthine of the general formula

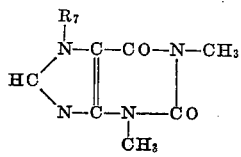

in which $R_7$ stands for a group selected from the class consisting of (di-lower-alkyl-amino)-lower alkyl groups,

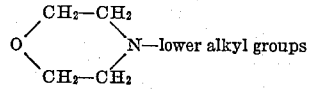

and

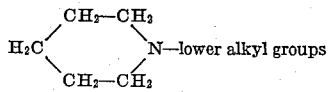

ALEXIS J. M. MOUSSALLI.
ANDRÉ SOUBIRAN.
PIERRE CHABRIER.

References Cited in the file of this patent

UNITED STATES PATENTS

| Number | Name | Date |
|---|---|---|
| 1,414,333 | Altwegg | May 2, 1922 |
| 2,397,799 | Martin et al. | Apr. 2, 1946 |
| 2,429,275 | Parker | Oct. 21, 1947 |

OTHER REFERENCES

Quevauviller et al., Ann. Pharm. Franc 7 32-9 (1949).

Jensen et al., Acta Chemica Scandanavica, 2, 381-383 (1948).

Richter, Textbook of Organic Chemistry, 1938 edition, John Wiley and Sons, Inc., New York, N. Y., pp. 229, 230 and 240.